(12) United States Patent
Stevens

(10) Patent No.: US 6,338,111 B1
(45) Date of Patent: Jan. 8, 2002

(54) METHOD AND APPARATUS FOR REDUCING I/O INTERRUPTS

(75) Inventor: Jerry Wayne Stevens, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/255,202

(22) Filed: Feb. 22, 1999

(51) Int. Cl.[7] ................................................. G06F 9/46
(52) U.S. Cl. .......................................... 710/260; 710/48
(58) Field of Search ..................... 710/48–50, 260–267; 709/212, 234; 375/222

(56) References Cited

U.S. PATENT DOCUMENTS

| | | | |
|---|---|---|---|
| 4,751,634 A | * 6/1988 | Burrus, Jr. et al. ........... 710/63 |
| 5,537,646 A | 7/1996 | Buck et al. ................. 395/500 |
| 5,659,758 A | 8/1997 | Gentry et al. |
| 5,673,415 A | 9/1997 | Nguyen et al. ............. 395/476 |
| 5,678,057 A | 10/1997 | Rostoker et al. ............ 395/800 |
| 5,923,852 A | * 7/1999 | Lee et al. ................... 709/234 |
| 5,943,479 A | * 8/1999 | Klein et al. ................. 709/212 |
| 6,012,104 A | * 1/2000 | Van Nguyen et al. .......... 710/8 |
| 6,067,318 A | * 5/2000 | Bailey et al. ............... 375/222 |
| 6,115,776 A | * 9/2000 | Reid et al. .................. 710/260 |
| 6,216,182 B1 | * 4/2001 | Nguyen et al. ............... 710/48 |

* cited by examiner

*Primary Examiner*—Christopher B. Shin
(74) *Attorney, Agent, or Firm*—Jerry W. Herndon

(57) ABSTRACT

The invention reduces the number of data input/output interrupts in a computer, based on dynamic communication between an I/O adapter and a host. The invention can receive data and pass the data to the host for long periods of time with only a single initial interrupt of the host. If the host begins to fall behind in its processing of received data, the invention monitors the situation and initiates additional interrupts to the host. If additional interrupts are needed because the host is falling behind, the invention may further initiate additional processes for the processing of the data to relieve the host situation.

29 Claims, 5 Drawing Sheets

METHOD AND APPARATUS FOR REDUCING I/O INTERRUPTS

TECHNICAL FIELD

The invention relates generally to input/output data processing in computer systems and particularly to reducing the number of interrupts required for the processing of such I/O data.

BACKGROUND OF THE INVENTION

Today's networks transmit data at rates equal to multi-gigabytes per second and these rates continue to increase as user demands for ever faster transmission increase. Computing systems usually include input/output drivers that receive data packets from incoming lines, store the packets, and interrupt a host processor to alert the host of the presence of data for the host to process. Traditionally, an I/O device interrupts a host each time a complete packet of data is received and stored. As data transmission rates rise, this traditional technique of interrupting for each received packet consumes more and more of a host's processing resources, to the point that the traditional technique is unacceptable. Consequently, there have been attempts to reduce the interrupt rate to more efficiently utilize a host processor's resources. For example, one improved technique is disclosed in U.S. Pat. No. 5,659,758, which issued to Gentry et al on Aug. 19, 1997 Gentry teaches a technique that reduces the number of interrupts, while guaranteeing that a host will eventually be interrupted, based on elapsed time or the number of packets received. In Gentry, the I/O device is initially placed in a state such that the first received packet generates an interrupt. Thereafter, an interrupt will be generated each time N packets are received or for the next packet received after the expiration of a fixed time interval T. Thus, after receipt of an initial packet, if a burst of packets are received in short order, an interrupt is generated after each N of these packets. On the other hand, if less than N packets are received when the time interval T expires, then the next packet received thereafter will cause an interrupt. Gentry also mentions that the parameters N and T may be changed by the host. However, Gentry does not teach any algorithm that the host might use for changing these parameters.

While meritorious, Gentry still suffers from certain deficiencies. For example, it is possible for less than N packets to arrive before the expiration of T. In this event, the number of received packets is insufficient to trigger the interrupt based on N. When T expires, the I/O driver is primed to interrupt on the next received packet. However, if there is a long delay in receipt of the next packet, the interrupt is delayed and the resulting latency in processing of the already received packets may be intolerable. More important, however, is the fact that Gentry still generates a significant number of interrupts, which as transmission rates continue to increase can still present a performance problem. Further improvements are needed.

SUMMARY OF THE INVENTION

The invention improves the known methods of generating interrupts for the servicing of packets. The method is based on dynamic communication between an I/O adapter and a host I/O driver for which the data is destined. The invention has the capability to receive data and pass the data to the host for long periods of time with only a single initial interrupt of the host. If the host begins to fall behind in its processing of received data, the invention has the capability to monitor the situation and to initiate additional interrupts to the host. If additional interrupts are needed because the host is falling behind, the invention can initiate additional processes for the processing of the data to relieve the host situation, In the preferred embodiment, an arriving block of data is stored in a next element of an ordered array of storage elements by a data receiving process. That element is then marked as filled. If an I/O process for processing the elements is already executing, in general, no I/O interrupt is generated. The I/O process is designed to continue executing as long as there elements marked as filled to process. If an I/O process is not executing, an interrupt is generated to initiate the I/O process. Thereafter, the processing of elements by the I/O process is monitored by the data receiving process. If the I/O process falls behind the data receiving process by a specified threshold, another interrupt is generated by the data receiving process. When the I/O process begins to process a given element, that element is marked as not filled.

In the preferred embodiment, monitoring of the I/O process begins after the data receiving process fills an element and then determines that processing of an earlier filled element in the array has not begun. This earlier element is the element immediately preceding the element just filled in the preferred embodiment. During monitoring, the number of previously filled elements that are still marked as filled are counted and if this count exceeds a specified threshold, an additional interrupt is generated. Monitoring also includes measuring the time interval between the filling of an element with arriving data and the initiation of processing of that element by the input/output process. Another interrupt is generated if this time interval exceeds a specified time threshold.

DETAILED DESCRIPTION

Figure 1:
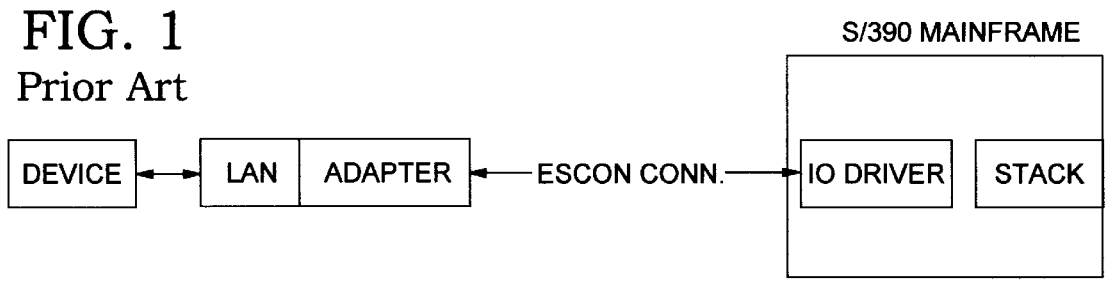
FIG. 1 shows a prior art network including an IBM System/390 mainframe receiving data from a remote device. This system generates an I/O interrupt for each packet of received data.

The preferred embodiment for practicing the invention is in a containing IBM System/390 computers. It is appreciated, however, that the invention is not limited to such systems. FIG. 1 shows prior art involving a networked IBM System/390 mainframe computer. The system comprises a device 100 attached to a Local Area Network (LAN) 102. LAN 102 has a channel adapter 104 that attaches the LAN and device 100 to a System/390 mainframe computer 106 via an Enterprise System Connection (ESCON) channel 108, which attaches to the host IO driver 110 in computer 106. Driver 110 passes packets of data received from device 100 to a stack 112 for processing. In this prior art system, IO device 104 interrupts the computer 106 each time a complete packet is received, so that the packet may be passed to the stack for processing. The interruption of a host each time a packet of data is received by an input device such as 110 is typical of prior art systems.

Figure 2:
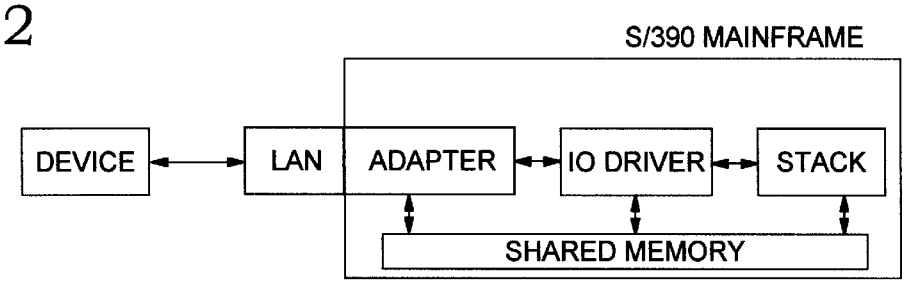
FIG. 2 hows a network, including an IBM System/390 mainframe, that is suitable for practicing the invention.

FIG. 2 shows a networked System/390 system in which the present invention may be practiced. Device 200 attaches directly to a LAN 202 and the LAN attaches to an adapter 204 that is local to the System/390 computer 206. The ESCON channel system is eliminated. Adapter 204 is connected to IO Driver 210, which receives packets from device 200 and passes them to stack 212 for processing. Adapter 204, IO Driver 210 and stack 212 dynamically communicate with each other via a shared memory 214. This dynamic communication allows for improvements in the generation of interrupts to service incoming packets, as described below.

Figure 3:
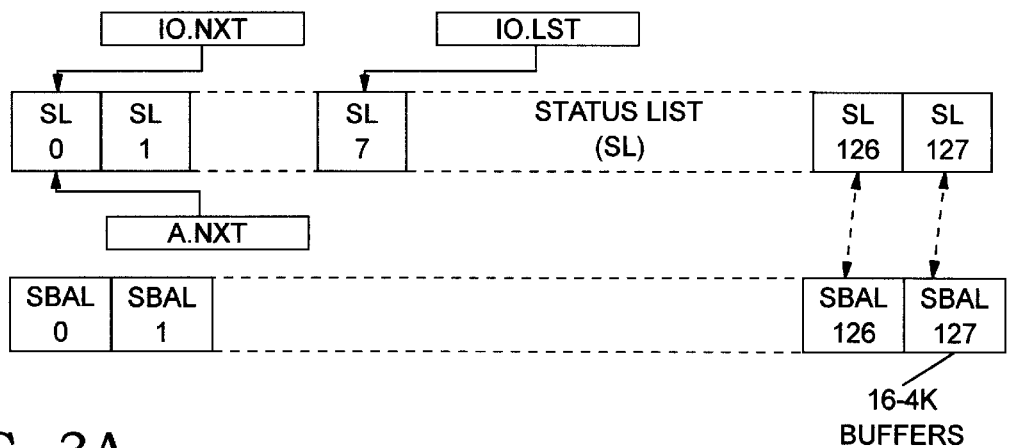
FIG. 3 shows a preferred data structure, including a circular array of elements for storing blocks of received data as they are received, and a corresponding array of status bytes that are used for marking the state of each of the storage elements. This FIG. illustrates the data structure at system startup time.

FIG. 3 shows one illustrative data structure that resides in shared memory 214 and that is used to pass incoming data from adapter 204 to IODriver 210 and thence to stack 212 for processing. The data structure is also used for the dynamic communication between the adapter, the IODriver and the stack, Incoming data to adapter 204 is stored in a number of SBALs 300. There are illustratively 128 SBALs numbered from 0 to 127. Each SBAL contains sixteen buffers of four thousand bytes each. The adapter 204 fills a SBAL with as many complete packets as will fit into the SBAL or until the data stops arriving, The SBALs are associated with 128 status bytes SL0 through SL127, arranged into an array called the status list 302 The status list bytes SL0 through SL127 each contain a state indicator, discussed below, that describes the state of processing of the data contained in the associated SBAL. This state of processing forms the core of the dynamic communication between the adapter 204, IODriver 206 and stack 212. The SBALs (and therefore the SLs) are filled and emptied on a circular basis. For this purpose, the adapter 204 maintains a pointer A.NXT that points to the next SL byte and SBAL to be filled. The IODriver 210 maintains two pointers to the status list. IO.NXT points to the next SL (and SBAL) from which it reads data for passing to the stack. IO.LST is not particularly relevant to the invention. But, for completeness, it should be said that in this illustrative and preferred embodiment, the status list bytes (and therefore the SBALs) circumscribed by IO.NXT and IO.LST define the SBALs for which buffer space has been allotted. This represents an effort in the preferred embodiment to efficiently preserve memory. The system attempts to allocate buffer space to only eight of the SBALs at a time, with allocation and deallocation of buffer space occurring as needed as the status list (and SBALs) are traversed in a circular manner. When buffer space is allocated to an SBAL that does not yet contain data, its corresponding status list byte is set to the state "AVAIL" to indicate that the SBAL is available to adapter 204. If no buffer space is allocated to an SAL, the corresponding status list byte is set to "RESET". When adapter 204 fills an SBAL with data, it sets the status list byte to "FILLED". Generally, when data from an SBAL is being processed by the stack, the corresponding status list byte is set to "PROC".

FIG. 3 shows a startup state of the system in which there is no data stored in the SBALs. A.NXT and IO.NXT both point to SL0 (the next SBAL to be filled) and IO.LST points to SL7. This means that immediately after startup, buffer space is allocated to eight SBALs corresponding to SL0 through SL7. Therefore, SL0 through SL7 are each set to "AVAIL". The remaining status list bytes are set to "RESET".

Figure 3A:
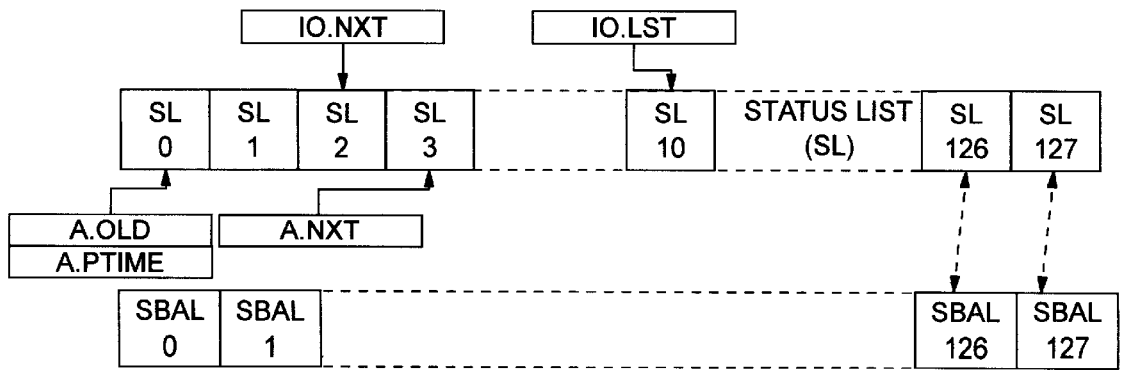
FIG. 3a data structure of FIG. 3 a short time after startup after a few blocks of data have been received.

FIG. 3a shows the state of the data structure of FIG. 3 a short time after system startup and after some SBALs have been filled. By way of example, A.NXT points to SL3 which is the next SBAL to be filled. If I/O processing is keeping-up with data arriving to the adapter, I/O processing will generally be one SBAL behind data the adapter. This is shown in FIG. 3a in which IO.NXT points to SL2, which is the next SBAL that I/O processing will address. Generally, IO.LST follows IO.NXT and therefore points to SL10 in FIG. 3a. FIG. 3a also shows a word A.OLD that may point to an SL in the status list behind A.NXT, and an associated word A.PTIME. A.OLD is used during threshold processing when it appears that the processing of data by the stack is falling behind. The SL pointed to by A.OLD is the SL on which threshold monitoring begins. A.PTIME contains the time when monitoring began on that SL. This will become clearer below in conjunction with a description of the algorithms performed by the adapter, IODriver and stack, In FIG. 3a, A.OLD illustratively points to SL0. This means that at some point in time when SBAL0 was being filled, the adapter determined that I/O processing might be falling behind and initiated threshold monitoring on that SBAL.

Figure 4:
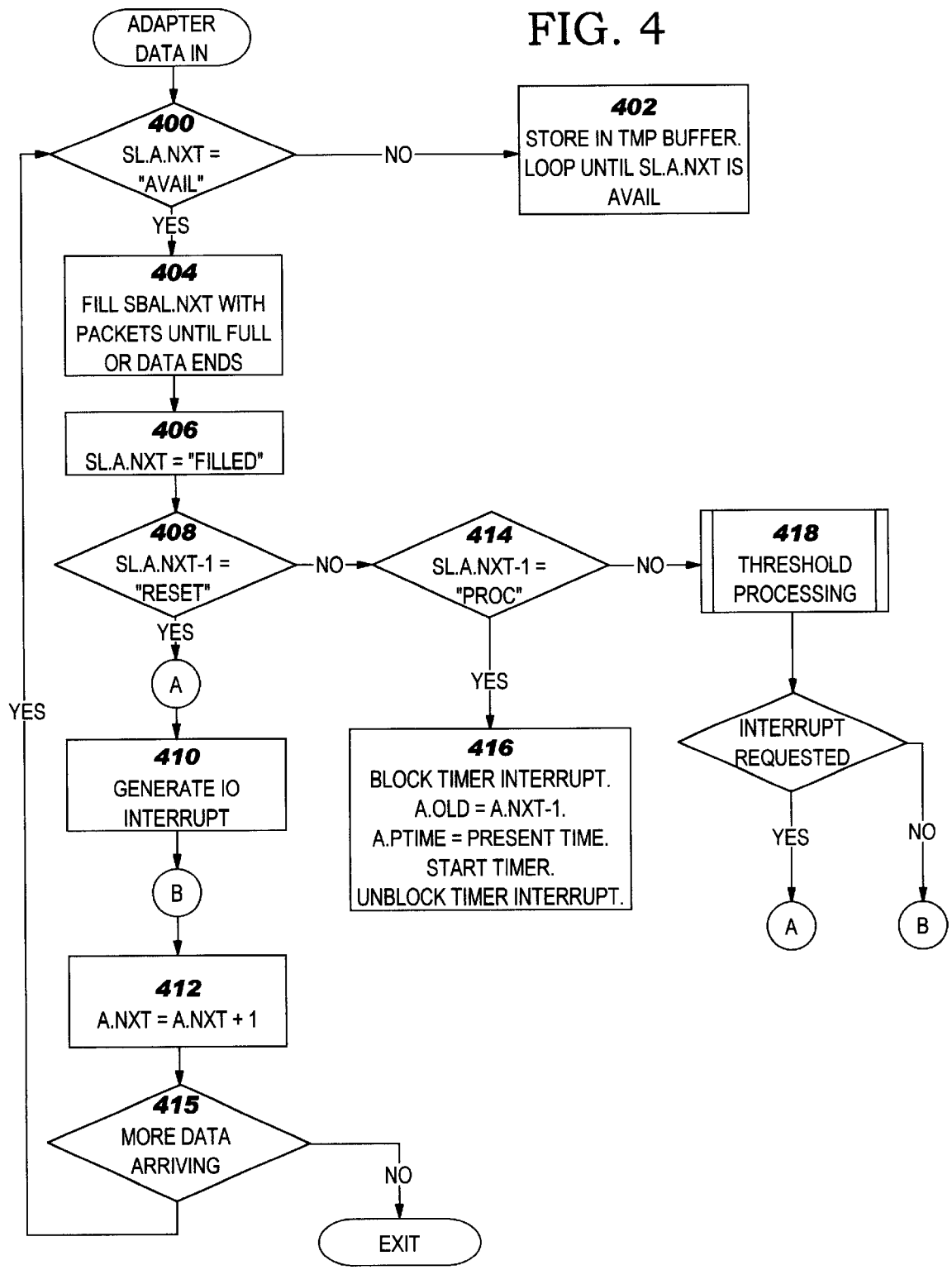
FIG. 4 shows an illustrative flowchart of the data receiving process.
Figure 5:
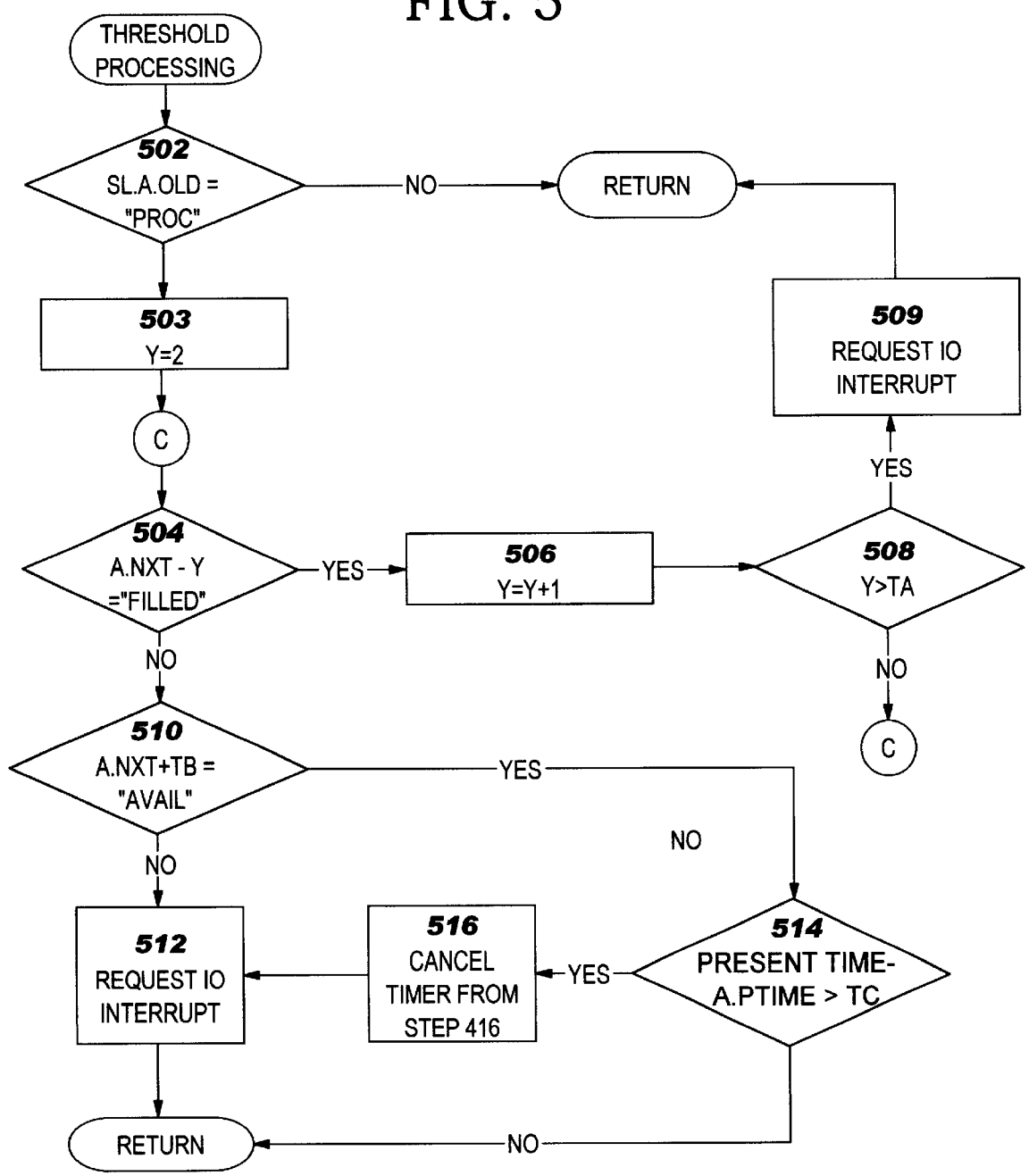
FIG. 5 shows an illustrative flowchart of a process that monitors the processing of filled elements.

FIGS. 4 and 5 show the steps performed by adapter 204 to receive incoming data, Entry is made to ADAPTER DATA IN in FIG. 4 when data is arriving from LAN 202. The first step is to decide where to store the data. Recall that A.NXT points to the next SL and SBAL to be used for storing incoming data. Step 400 determines if the status list byte pointed by A.NXT (SL.A.NXT) is set to "AVAIL". If so, then the associated buffers will be filled for this SBAL and the program continues at step 404. If SL.A.NXT is not set to "AVAIL", the adapter must wait until memory is allocated. This is illustrated at step 402. At step 404, the adapter fills the designated SBAL (SBAL.A.NXT) with packet data until it cannot contain another complete packet or the data stops. Step 406 sets the appropriate SL byte (SL.A.NXT) to "FILLED" to indicate that it contains new data. A determination must now be made if an interrupt to IODriver 210 is required to process this data. Step 408 checks the status of the immediately preceding SL byte (SL.A.NXT-1) for "RESET". At system startup, this SL byte is SL127, which contains a status of "RESET". Therefore, for this first received incoming data, step 410 is executed to generate a first interrupt. Step 412 increments A.NXT so that SBAL 1 will next be filled. Step 415 next looks at the same parameters (not shown) that are used to enter ADAPTER DATA IN to determine if data is still arriving to the adapter. If so, then step 415 loops back to step 400 to continue the process of receiving data. Otherwise, ADAPTER DATA IN exits.

Figure 6:
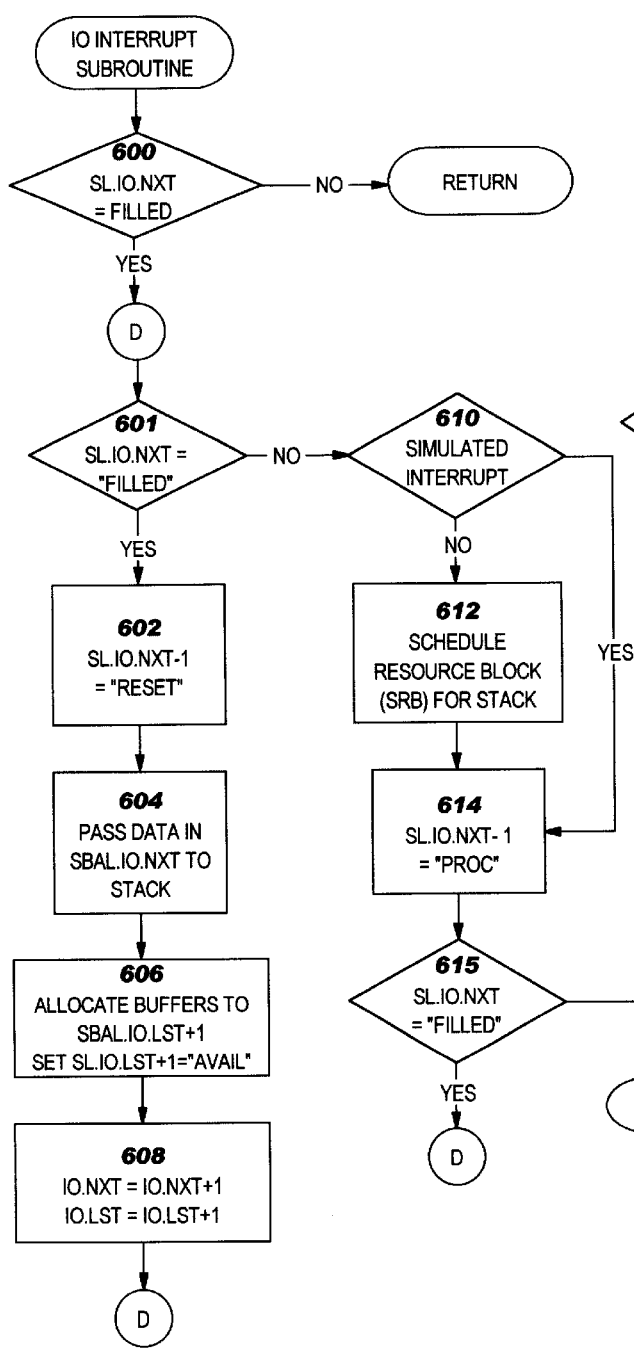
FIG. 6 shows an illustrative flowchart of the I/O process that initiates processing of filled elements by passing them to a stack process.

As a result of the interrupt just generated at step 410, an entry is made to the IO interrupt subroutine shown in FIG. 6. Only one instance of this subroutine can execute at a time and the subroutine calls are serialized by system locks. Step 600 reads the SL byte corresponding to its next pointer IO.NXT to determine if it is set to "FILLED". If IO.NXT is not set to "FILLED", then there is no data to process and this subroutine merely returns to its caller. Initially, as in this example, IO.NXT point to SL0, which has just been set to "FILLED" by the adapter. Step 601 is the beginning of a loop, the first step of which is to test for data in the next SBAL. Therefore, step 601 tests again SL.IO.NXT for "FILLED". Step 602 sets the immediately preceding SL (SL.IO.NXT−1) to "RESETT". Step 604 passes the data in SBAL.IO.NXT to stack processing by temporarily transferring the buffers to the stack queue. Step 606 allocates buffers to the next succeeding SBAL (SBAL.IO.LST+1) and sets SL.IO.LST+1 to "AVAIL" to maintain the list of eight buffers which are available for data. Finally, step 608 increments the IODriver next point IO.NXT and last pointer IO.LST. At this point, the adapter pointer A.NXT and the IODriver pointer IO.NXT both point to SL1. SL0 is set to "FILLED" and the data from SBAL0 is in the stack queue for processing. The interrupt subroutine then loops at label D to step 601 to process the next SBAL pointed to by IO.NXT if that SBAL is filled with data. Assuming that the next SBAL does not contain data, step 610 determines if this entry to the interrupt subroutine is a result of a simulated interrupt. A simulated interrupt means that stack processing is already in progress, as described below with respect to FIG. 7. In the present case, this is a real interrupt and stack processing is not in progress. Step 612 therefore schedules a resource block (SRB) for the stack, In System/390 parlance, an SRB is a request for initiation of a process, in this case the stack process of FIG. 7. Had this been a simulated interrupt, step 612 would have been skipped. In either event, step 614 next sets the SL byte pointed to by IO.NXT−1 (SL0 in this example) to "PROC" to indicate that the data from this SBAL (SBAL0) is scheduled for processing by the stack process.

Figure 7:
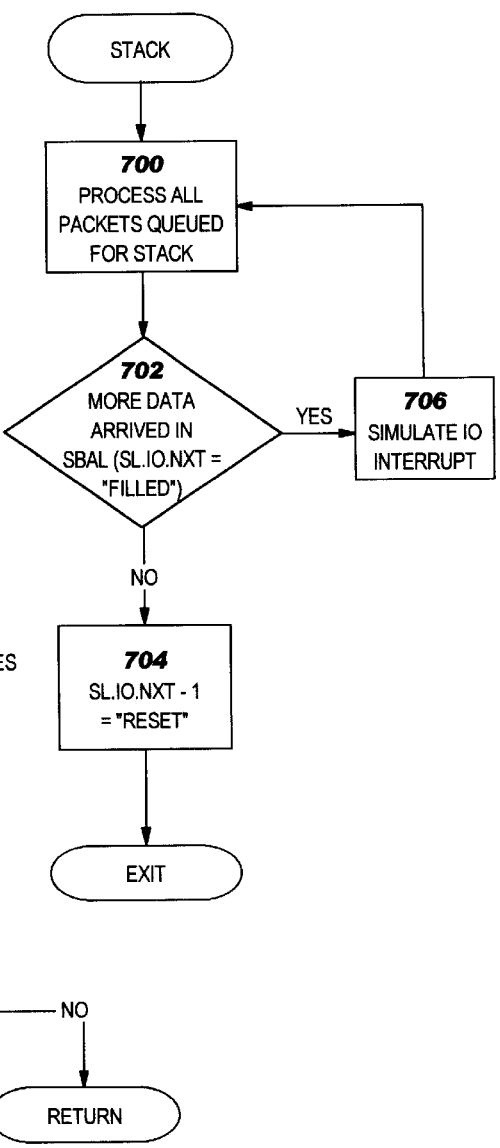
FIG. 7 shows an illustrative flowchart of the stack process.

Once a stack process is scheduled by an SRB, the stack process illustrated in FIG. 7 is entered to process the data in its queue. When this occurs, step 700 processes all of the data that is presently queued. Step 702 next peeks down into the adapter data structure to determine if additional data has arrived at the adapter (this is true if SL.IO.NXT="FILLED") and is now ready for stack processing. If new data is present at the adapter, step 706 of the stack routine simulates an IO interrupt. In the preferred embodiment, this simulated interrupt is actually a subroutine call to the IO INTERRUPT SUBROUTINE of FIG. 6. Importantly in accordance with the invention, this simulated interrupt avoids the environment saving required at the beginning of an interrupt and the environment restoration required at the end of the interrupt to return to the processing state immediately before an interrupt. When the IO INTERRUPT SUBROUTINE returns to step 706, step 700 is next executed to process any data the might have been transferred to the stack queue by the interrupt subroutine. Thus, it is seen that dynamic communication between the interrupt routine and stack processing via the state of the SL bytes continues the processing of arriving data, without the necessity of creating additional interrupts. In principle, it is possible for this processing to continue indefinitely on the creation of the single initial interrupt at step 410. Eventually, when data ceases to arrive at the adapter, step 704 sets the last SBAL just processed (SL.IO.NXT−1) t0 "RESET" and de-allocates the buffers assigned to the SBAL. It should be appreciated that IO.NXT points to the correct SL byte at this time, because its value is coordinated appropriately by the interrupt routine of FIG. 6.

Returning to the interrupt routine, step 614 was last discussed. During the processing of steps 601, 610, 612 and 614, it is possible that additional data arrived at the adapter. If this is true, IO.NXT will be set to "FILLED". Here it should be noted that the adapter will continue to mark slots filled (simultaneously with the host processing) as long as data continues to arrive, and slots are AVAIL. In accordance with the invention, if this is true, step 615 loops to label D of the interrupt routine to continue the processing of the new data, without requiring any additional interrupts. Otherwise, step 615 exits the interrupt routine because there is no additional data to process.

Reference is now made to FIG. 4 to continue the discussion of ADAPTER DATA IN. As already mentioned, after an SBAL is filled with data at steps 404 and 406, step 408 tests the previous SL byte for "RESETT". If it not set to "RESET", this means that the stack process of FIG. 7 has fallen somewhat behind the arrival of new data. In this event, step 414 checks that SL byte for "PROC" to determine if stack processing may be falling too far behind. Assuming that this SL byte is set to "PROC", then step 614 of the interrupt subroutine has at least gotten to the corresponding SBAL possibly via both real and simulated interrupts. In this event, in accordance with the invention, step 416 initiates the beginning of a timing function for the last SBAL that has been filled to measure the extent that stack processing may be falling behind. The result of this timing function may be eventually to generate additional real interrupts to avoid this situation. To initiate the function, step 416 first blocks interrupts that might be caused by a timing process. This insures that the following actions of step 416 are not corrupted by a timer interrupt. It next saves SL pointer A.NXT−1, which points to the SBAL marked as PROC, in A.OLD. This slot A.NXT−1 indicates where the adapter will start filling new slots. The generation of an interrupt at this point is intentionally avoided. Rather, the timing function now being initiated will be in reference to this SBAL whose identity is saved in A.OLD. It should be noted, however, that the identity of an SBAL saved in A.OLD can change (at step 416) as the I/O interrupt subroutine continues to process SBALs.

Figure 8:
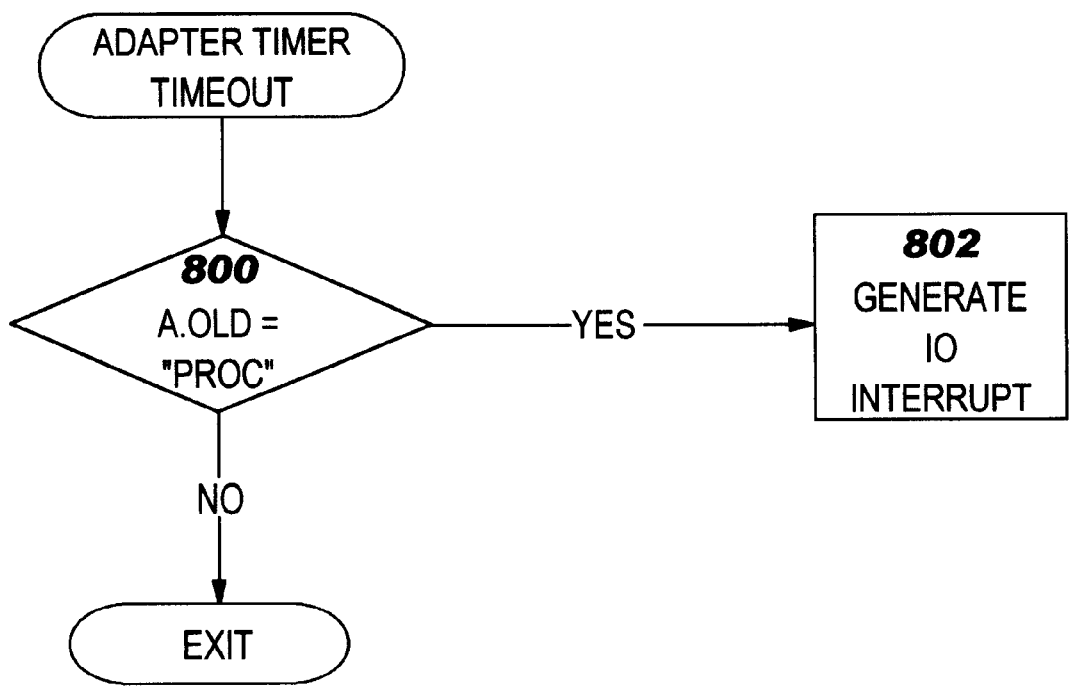
FIG. 8 shows an illustrative flowchart of a timeout process used to monitor operation of the I/O process.

Returning to the present discussion, step 416 next saves the present time in A.PTIME. It then starts a timer that is set to expire at a predetermined time (such a five milliseconds), in the future. Finally, step 416 unblocks the timer interrupt. Step 416 then branches to step 412 to continue the process of receiving incoming data. At first glance it might seem that it is possible for ADAPTER DATA IN to continue to execute step 416 as data arrives and therefore to repetitively re-initialize the timing function such that it never expires. This is not possible, because there can never be more than one SL byte set to "PROC" at any given time. This can be seen at step 602 of the IO interrupt subroutine in FIG. 6. Whenever the interrupt routine sees new data at step 601, step 602 sets the previous SL byte to "RESET" and that previous SL byte is the same SL byte that step 614 previously set to "PROCT". It is possible that step 416 is reentered, which cancels a previous timing function and starts a new one. But, all this means is that the stack is processing SBALs, although at a rate that continues the timer threshold monitoring. Should a timing function expire, an entry is made to the ADAPTER TIMER TIMEOUT process in FIG. 8. Step 800 of this process merely tests A.OLD for the state "PROCT". If this is true, it means that the SBAL that triggered timing monitoring by step 416 has not been processed by the stack process of FIG. 7 during the predetermined time threshold set for the timing function. Step 802 generates another real IO interrupt. This real interrupt causes an entry to the I/O driver subroutine in FIG.

6. This entry will process any SLs marked as FILLED via the loop that includes step 602. Eventually, step 601 will branch to step 610. Because this is a real interrupt, step 610 branches to step 612 where another stack thread is initiated via a Schedule Resource Block (SRB) function. This creates the possibility of simultaneously running multiple stack processes in order for stack processing to catch-up with arriving data, Eventually, the stack processes terminate automatically as they run out of new data to process.

Returning to the discussion of ADAPTER DATA IN, step 414 has just filled the SBAL corresponding to SL.A.NXT with new data. If the state of the immediately preceding SL byte (SL.A.NXT−1 is not equal to "PROC", this means that the IO interrupt subroutine in FIG. 6 is falling behind the arrival of new data, In this event, additional threshold processing is initiated at step 418. Step 418 calls a threshold processing subroutine shown in FIG. 5. Step 502 of this subroutine examines SL.A.OLD for the state of "PROCT". If A.OLD is not set to "PROC", then the SBAL that initiated threshold monitoring at step 416 has been processed by the stack process of FIG. 7. In this event, threshold monitoring succeeds for the time being and the threshold processing subroutine simply exits at 501. If A.OLD is set to "PROC", then additional threshold processing is necessary. The threshold processing subroutine monitors three thresholds, 1) the number of SBALs that have been filled by ADAPTER DATA IN, but not reached by the IO interrupt subroutine, 2) whether ADAPTER DATA IN is getting too close to the last SBAL that has assigned buffer space, and 3) an additional timing test that is functionally equivalent to the timing function initiated at step 416. The latter timing threshold test is simply an attempt to avoid a timeout interrupt from step 416 if possible.

Step 503 begins the first threshold test. This test counts the number of SBALs that have been filled and not reached by the IO interrupt routine. Initially, it is known that the count is at least two from step 406 and step 414. Therefore, step 503 starts the count Y at two. Steps 504, 506 and 508 continue the count by looping at the label C until either the count threshold TA is exceeded at step 508 or the count ends before TA is reached. If TA is exceeded at step 508, then a flag is set at step 509 to request a real IO interrupt and threshold processing ends. If the first threshold test succeeds, then step 510 begins the second test. As mentioned, the test determines if ADAPTER DATA IN is too close to the end of the SBALs that have assigned buffer space. Step 510 therefore looks ahead in the status list by an integer threshold TB to see if the that SL byte is set to "AVAIL". A satisfactory range for TB is usually 1, 2 or 3. If this test fails, then step 512 sets the flag to request an interrupt. If the test succeeds, then the third timing function test is performed at step 514. This test determines if the present time minus the value in A.PTIME (see step 416) exceeds a time threshold TC. If so, a timing function timeout interrupt has just occurred or is imminent. Step 516 attempts to avoid the timer interrupt if possible by canceling the step 416 timer if it is still running. Step 512 then requests an IO interrupt by setting the flag. Suitable values for TC are slightly less than the timing interval set at step 416. When the threshold processing subroutine returns to ADAPTER DATA IN, step 420 interrogates the interrupt requested flag and generates an IO interrupt at step 410 if the flag is set. Otherwise, step 420 branches to step 412 to continue data in processing.

It is to be understood that the above described arrangements are merely illustrative of the application of principles of the invention and that other arrangements may be devised by workers skilled in the art without departing from the spirit and scope of the invention.

What is claimed:

1. In a computer, a method of reducing data input/output interrupts, comprising receiving arriving data and storing the data in blocks for processing, as blocks are stored, determining if an interrupt process is already running to process the blocks, generating an interrupt if an interrupt process is not running, transferring all blocks to a stack process for processing in a single instance of the interrupt process as long as blocks are available for processing, monitoring the rate of processing of blocks relative to the arrival rate of new blocks, and activating additional stack processes if the processing of blocks falls behind the arrival of new blocks by a specified threshold.

2. In a computer, a method of reducing data input/output interrupts, comprising a) storing a block of arriving data in a next element of an ordered array of storage elements, b) marking that next element as filled, c) determining if an input/output process is already in progress, d) generating an input/output interrupt to initiate the input/output process if the process is not already in progress, e) monitoring the processing of elements by the input/output process, f) generating another input/output interrupted if the processing of elements by the input/output process degrades by a specified threshold, g) processing all elements marked as filled in a single instance of the input/output process, and h) marking each element as not filled when processing of the element is initiated by the input/output process.

3. The method of claim 2 further comprising initiating the monitoring step after the next element is filled with arriving data and a preceding element that was earlier filled is not marked as not filled.

4. The method of claim 3 wherein the preceding element is the element immediately preceding the last element filled.

5. The method of claim 2 wherein the monitoring step further comprises determining if a specified number of contiguous elements previously marked as filled are still marked as filled.

6. The method of claim 2 wherein the monitoring step further comprises determining if the time interval between the filling of an element with arriving data and the initiation of processing of that element by the input/output interrupt process exceeds a specified threshold.

7. In a computer, a method of reducing data input/output interrupts, comprising by a data receiving process, a) maintaining a first indication of a next storage element to be filled with arriving data in an ordered array of storage elements, b) storing (404) a block of data arriving at the computer in the next element, c) marking (406) that next element as filled, d) updating the first indication to point to the next element to be filled with arriving data, e) determining (408) if an immediately preceding element that was filled is marked as not available, and f) generating (410) an input/output interrupt to initiate the interrupt process if the immediately preceding element that was filled is marked as not available, and by the input/output interrupt process, g) maintaining a second indication of a next element to be processed, h) determining if the next element to be processed is marked as filled, i) initiating the processing of the next element if it is filled and marking the immediately preceding element as not available, j) updating the second indication to point to the next element to be processed, k) repeating steps g) through j) in a single present instance of the input/output process until the next element to be processed is marked as not filled, l) setting the element immediately preceding the element marked as not filled to processing, and m) terminating the present instance of the input/output process after completion of step 1.

8. The method of claim 7 wherein step i) further comprises marking as available the element immediately succeeding an element for which processing is initiated.

9. The method of claim 8 further comprising initiating monitoring of the input/output interrupt process by the data receiving process after the next element is filled and the immediately preceding element is marked neither as not available or processing.

10. The method of claim 9 wherein the monitoring step further comprises determining if the processing of elements by the input/output process is falling behind the arrival of new data by counting the number of elements previously marked as filled as still marked as filled, and generating an input/output interrupt if the input/output process is falling behind.

11. The method of claim 8 further comprising initiating a timing function by the data receiving process, the timing function set to timeout after a specified time interval after the next element is filled and the immediately preceding element is marked as processing, saving the identity of the element immediately preceding the element just filled, and on timeout of the timing function, generating an input/output interrupt if the element whose identity was saved in the preceding step is marked as processing.

12. Apparatus for use in a computer for reducing data input/output interrupts, comprising means for receiving arriving data, means for storing the data in blocks for processing, means responsive to the storing means for determining if an interrupt process is already running to process the blocks, means for generating an interrupt if an interrupt process is not running, means for transferring all blocks containing data to a stack process for processing in a single instance of the interrupt process, means for monitoring the rate of processing of blocks relative to the arrival rate of new blocks, and means for detecting if the processing of blocks falls behind the arrival of new blocks by a specified threshold, means responsive to the detecting means for activating additional stack processes.

13. The apparatus of claim 12 further comprising means for activating the monitoring means after the next block is filled with arriving data and a preceding block that was earlier filled is not marked as not filled.

14. The apparatus of claim 13 wherein the activating means further comprises means for testing if the block immediately preceding the last block filled is marked as not filled.

15. The apparatus of claim 12 wherein the monitoring means further comprises means for determining if a specified number of contiguous blocks previously marked as filled are still marked as filled.

16. The apparatus of claim 12 wherein the monitoring means further comprises means for determining if the time interval between the filling of a block with arriving data and the initiation of processing of that block by the input/output interrupt process exceeds a specified threshold.

17. A computer program embodied on a computer-readable medium for reducing data input/output interrupts in a computer, comprising a code segment for receiving arriving data, a code segment for storing the data in blocks for processing, a code responsive to the storage of a block for determining if an interrupt process is already running to process the block, a code segment for generating an interrupt if an interrupt process is not running, a code segment for transferring all blocks to a stack process for processing in a single instance of the interrupt process as long as blocks are available for processing, a code segment for monitoring the rate of processing of blocks relative to the arrival rate of new blocks, and a code segment for activating additional stack processes if the processing of blocks falls behind the arrival of new blocks by a specified threshold.

18. The computer program of claim 17 further comprising a code segment for initiating the monitoring step after the next block is filled with arriving data and a preceding block that was earlier filled is not marked as not filled.

19. The computer program of claim 18 wherein the code segment for activating additional stack processes further comprises a code segment for determining if the block immediately preceding the last block filled.

20. The computer program of claim 17 wherein the code segment for monitoring further comprises a code segment for determining if a specified number of contiguous blocks previously marked as filled are still marked as filled.

21. The computer program of claim 17 wherein the code segment for monitoring further comprises a code segment for determining if the time interval between the filling of an block with arriving data and the initiation of processing of that block by the input/output interrupt process exceeds a specified threshold.

22. A data signal embodied in a carrier wave containing code segments for execution by a computer to reduce the number of input/output interrupts, comprising, a code segment for receiving arriving data, a code segment for storing the data in blocks for processing, a code responsive to the storage of a block for determining if an interrupt process is already running to process the block, a code segment for generating an interrupt if an interrupt process is not running, a code segment for transferring all blocks to a stack process for processing in a single instance of the interrupt process as long as blocks are available for processing, a code segment for monitoring the rate of processing of blocks relative to the arrival rate of new blocks, and a code segment for activating additional stack processes if the processing of blocks falls behind the arrival of new blocks by a specified threshold.

23. The data signal of claim 22 further comprising a code segment for initiating the monitoring step after the next block is filled with arriving data and a preceding block that was earlier filled is not marked as not filled.

24. The data signal of claim 23 wherein the code segment for activating additional stack processes further comprises a code segment for determining if the block immediately preceding the last block filled.

25. The data signal of claim 22 wherein the code segment for monitoring further comprises a code segment for determining if a specified number of contiguous blocks previously marked as filled are still marked as filled.

26. The data signal of claim 22 wherein the code segment for monitoring further comprises a code segment for determining if the time interval between the filling of an block with arriving data and the initiation of processing of that block by the input/output interrupt process exceeds a specified threshold.

27. Apparatus for use in a computer for reducing data input/output interrupts, comprising a) means for storing a block of arriving data in a next element of an ordered array of storage elements, b) means for marking that next element as filled, c) means for determining if an input/output process is already in progress, d) means for generating an input/output interrupt to initiate the input/output process if the process is not already in progress, e) means for monitoring the processing of elements by the input/output process, f) means for generating another input/output interrupt if the processing of elements by the input/output process degrades by a specified threshold, g) means for processing all elements marked as filled in a single instance of the input/output process, and h) means for marking each element as not filled when processing of the element is initiated by the input/output process.

28. A computer program embodied on a computer-readable medium for reducing input/output interrupts in a computer, comprising a) a code segment for storing a block of arriving data in a next element of an ordered array of storage elements, b) a code segment for marking that next element as filled, c) a code segment for determining if an input/output process is already in progress, d) a code segment for generating an input/output interrupt to initiate the input/output process if the process is not already in progress, e) a code segment for monitoring the processing of elements by the input/output process, f) a code segment for generating another input/output interrupt if the processing of elements by the input/output process degrades by a specified threshold, g) a code segment for processing all elements marked as filled in a single instance of the input/output process, and h) a code segment for marking each element as not filled when processing of the element is initiated by the input/output process.

29. A data signal embodied in a carrier wave containing code segments for execution by a computer to reduce the number of input/output interrupts, comprising, a) a code segment for storing a block of arriving data in a next element of an ordered array of storage elements, b) a code segment for marking that next element as filled, c) a code segment for determining if an input/output process is already in progress, d) a code segment for generating an input/output interrupt to initiate the input/output process if the process is not already in progress, e) a code segment for monitoring the processing of elements by the input/output process, f) a code segment for generating another input/output interrupt if the processing of elements by the input/output process degrades by a specified threshold, g) a code segment for processing all elements marked as filled in a single instance of the input/output process, and h) a code segment for marking each element as not filled when processing of the element is initiated by the input/output process.

* * * * *